(12) United States Patent
Meffert et al.

(10) Patent No.: US 6,900,165 B2
(45) Date of Patent: *May 31, 2005

(54) USE OF CROSS-LINKED POLYVINYLPYRROLIDONE AS A DISINTEGRANT IN COMPACT, PARTICULATE DETERGENTS AND CLEANING AGENTS

(75) Inventors: Helmut Meffert, Ludwigshafen (DE); Werner Bertleff, Viernheim (DE); Michael Kerber, Weinheim (DE); Peter Spang, St Ingbert (DE); Richard Baur, Mutterstadt (DE); Marcos Gomez, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 262 days.

This patent is subject to a terminal disclaimer.

(21) Appl. No.: 10/220,279

(22) PCT Filed: Mar. 9, 2001

(86) PCT No.: PCT/EP01/02644

§ 371 (c)(1),
(2), (4) Date: Sep. 9, 2002

(87) PCT Pub. No.: WO01/66612

PCT Pub. Date: Sep. 13, 2001

(65) Prior Publication Data

US 2003/0032574 A1 Feb. 13, 2003

(30) Foreign Application Priority Data

Mar. 10, 2000 (DE) .......................................... 100 11 137
Jan. 19, 2001 (DE) .......................................... 101 02 538

(51) Int. Cl.⁷ ............................. C11D 3/37; C11D 17/00
(52) U.S. Cl. ................ 510/276; 510/294; 510/298; 510/220; 510/224; 510/446; 510/475
(58) Field of Search .......................... 510/276, 294, 510/298, 446, 220, 224, 475; 528/310

(56) References Cited

U.S. PATENT DOCUMENTS 4,956,430 A    9/1990  Tazi .......................... 526/195
4,994,555 A  *  2/1991  Panzone et al. ............ 530/344
5,006,345 A  *  4/1991  Lang .......................... 424/467
5,312,619 A  *  5/1994  Shih et al. ................ 424/78.25
5,360,567 A     11/1994  Fry et al. .................... 510/298
5,407,594 A     4/1995  Fry et al. .................... 510/439
5,599,898 A  *  2/1997  Hartmann et al. .......... 528/310
5,702,721 A  * 12/1997  Horstmann et al. ........ 424/449
5,849,329 A  * 12/1998  Conte et al. ................ 424/469
6,025,315 A     2/2000  Gorlin et al. ............... 510/224
6,162,777 A  * 12/2000  Gorlin et al. ............... 510/224
6,191,089 B1 *  2/2001  Gorlin et al. ............... 510/224
6,329,334 B1 * 12/2001  Bertleff et al. ............. 510/445
6,486,111 B1 * 11/2002  Zabarylo et al. ............ 510/314
6,512,066 B1 *  1/2003  Steinmetz et al. .......... 526/264
6,677,417 B2 *  1/2004  Meffert et al. .............. 526/264

FOREIGN PATENT DOCUMENTS

| DE | 196 49 560 | 6/1998 |
| DE | 196 49 565 | 6/1998 |
| DE | 197 10 254 | 9/1998 |
| EP | 0 175 335 | 3/1986 |
| EP | 0 340 013 | 11/1989 |
| EP | 0 508 358 | 10/1992 |
| EP | 0 518 888 | 12/1992 |
| EP | 1 036 839 | 9/2000 |
| WO | WO 94/20555 A1 * | 9/1994 |

OTHER PUBLICATIONS

D. Gissinger et al.: "A comparative evaluation of the properties of some tablet disintegrants" Drug Development and Industrial Pharmacy, band 6(5), pp. 511–536.

* cited by examiner

*Primary Examiner*—Lorna M. Douyon
(74) *Attorney, Agent, or Firm*—Oblon, Spivak, McClelland, Maier & Neustadt, P.C.

(57) ABSTRACT

Incorporation of crosslinked polyvinylpyrrolidone in a specific particle composition as a disintegrant in compact particulate laundry detergents or cleaning products, such a particle composition and the compact particulate laundry detergents themselves, a process for preparing such a compact particulate laundry detergents or cleaning products, and a process for preparing specific particle compositions.

33 Claims, No Drawings

USE OF CROSS-LINKED POLYVINYLPYRROLIDONE AS A DISINTEGRANT IN COMPACT, PARTICULATE DETERGENTS AND CLEANING AGENTS

The invention relates to the use of crosslinked polyvinylpyrrolidone in a specific particle composition as a disintegrant in compact particulate laundry detergents and cleaning products, to the particle composition and the compact particulate laundry detergents themselves, to a process for preparing the compact particulate laundry detergents and cleaning products, and to a process for preparing the specific particle composition.

Compact laundry detergent and cleaning product formulations are prepared using different agglomerating, compacting or tableting technologies. In the case of compact laundry detergents and cleaning products in the form, for example, of tablets, it is difficult to strike the right balance between sufficient strength and sufficiently rapid dissolution or disintegration on exposure to water.

For example, laundry detergent tablets dosed via the detergent compartment of the washing machine are required to disintegrate within a period of less than one minute when combined with water. Laundry detergent tablets with a low degree of compaction, although achieving a satisfactory disintegration rate in use, often lack the desired fracture hardness or abrasion resistance. The fracture resistance of tablets produced in this way is low, and they tend to crumble and break up in transit.

On the other hand, excessive compacting or compression during the production of laundry detergent tablets results in them having unsatisfactorily long disintegration or dissolution times in use.

Compact and ultracompact laundry detergents and cleaning products are known, for example, from EP-A-340013, EP-A-0518888, DE-A-19649560 and DE-A-19649565.

Numerous possibilities exist, known from the technology of pharmaceutical tablet manufacture, for producing tablets possessing desired strength and disintegration time. The principal mechanisms which act to bring about the disintegration of tablets are described as being wetting, capillary effects (wicking), and swelling; cf. Drug Development and Industrial Pharma, Volume 6 (5) 511–536 (1980).

The products described as leading to improved tablet solubility include chemically crosslinked, swelling products such as microcrystalline crosslinked carboxymethylcellulose, crosslinked Na carboxymethylstarch, and crosslinked polyvinylpyrrolidone (see also Volker Bühler, Kollidon—Polyvinylpyrrolidone for the pharmaceutical industry, BASF August 1993, p. 156 f.).

Owing to the fraction of nonionic surfactants and other low-melting, waxlike, plastically deformable masses in laundry detergents, the addition of tablet disintegrants known from pharmacy to compact laundry detergents and cleaning products, especially in the case of compact laundry detergents, is seldom successful.

U.S. Pat. No. 5,360,567 discloses compact laundry detergent tablets whose binders/disintegrants may include crosslinked polyvinylpyrrolidone of the brand names Kollidon $CL^{(R)}$ or Polyplasdone $XL^{(R)}$. These brands are understood to be compositions of particles of crosslinked polyvinylpyrrolidone having a particle size distribution of from about 30 $\mu$m to 170 $\mu$m and an average particle size $X_{50}$ of from about 75 $\mu$m to 100 $\mu$m. Although adjusting the particle size distribution of all the ingredients of the compact laundry detergents to a size of from 200 to 2000 $\mu$m before compacting does achieve improved dissolution of the laundry detergent tablets, the results obtained are still not satisfactory. The technique has the further disadvantage that all of the ingredients of the laundry detergent tablet have to be adjusted to a defined particle size.

Further compact laundry detergent tablets comprising crosslinked polyvinylpyrrolidone of brands Kollidon $CL^{(R)}$ or Polyplasdone $XL^{(R)}$ as binder/disintegrant are described in U.S. Pat. No. 6,025,315 and U.S. Pat. No. 5,407,594. Here again, the dissolution rates achieved in water are still not satisfactory given the amount of disintegrants used.

EP 1036839 describes the use of crosslinked polyvinylpyrrolidone as an additive to compact particulate laundry detergents and cleaning products in order to increase their disintegration rate on combination with water, the crosslinked polyvinylpyrrolidone particles having a size of from 50 to 400 $\mu$m. This specific particle size distribution of from 50 to 400 $\mu$m, which can be set for example by classifying polyvinylpyrrolidone obtained in a broad particle size distribution, does achieve very rapid dissolution rates of the compact particulate laundry detergents; however, a large amount of disintegrant has to be used in order to do so.

Furthermore DE 197 10 254 A1 discloses the increased disintegration rate of compact laundry detergents and cleaning products (shaped bodies having a laundering and cleaning action) comprising, in a specific, granulated form, disintegrants which are known from pharmacy, are capable of increasing the porosity and/or capillarity of the tablets, and possess a high adsorption capacity for water. The compact laundry detergents and cleaning products produced in this way exhibit a disintegration rate which, although heightened, is still not sufficiently high, especially in the case of compact laundry detergents and cleaning products which have been compacted at relatively high pressures in order to increase their shape stability and fracture resistance. Furthermore, the compact laundry detergents and cleaning products produced in this way have the disadvantage that the disintegrant has to be converted into a granulated form prior to compacting, in a complex process step.

It is an object of the present invention to provide disintegrants which further increase the disintegration rate of compact particulate laundry detergents and cleaning products, need be used only in small amounts, and do not have the other, abovementioned disadvantages of the prior art.

We have found that this object is achieved in accordance with the invention by the use of a particle composition comprising particles of crosslinked polyvinylpyrrolidone as disintegrants in compact particulate laundry detergents and cleaning products, where A not more than 10% by weight of the particles of the crosslinked polyvinylpyrrolidone have a size less then 63 $\mu$m, B not more than 30% by weight and at least 0.1% by weight of the particles of the crosslinked polyvinylpyrrolidone have a size greater than 1000 $\mu$m, and C at least 10% by weight of the particles of the crosslinked polyvinylpyrrolidone have a size less than 200 $\mu$m.

Through the use of this particles composition comprising particles of crosslinked polyvinylpyrrolidone having the specific particle size distribution in accordance with features A, B and C as disintegrants in compact particulate laundry detergents and cleaning products, very rapid dissolution times in water are achieved for a small deployed amount of the disintegrants and high breaking stress of the compact particulate laundry detergents and cleaning products.

For the purposes of the present invention, disintegrants are, particularly, additives to compact particulate laundry detergents and cleaning products that increase the disintegration rate of the compact particulate laundry detergents and cleaning products when they are brought together with water, as compared with compact particulate laundry detergents and cleaning products.

For the purposes of the present invention, compact particulate laundry detergents and cleaning products are shaped bodies, especially tablets, with a washing or cleaning activity, such as laundry detergent tablets, dishwasher detergent tablets, bleach tablets, scouring salt tablets or water softener tablets, particularly laundry detergent tablets for household use, especially for machine use. The term "shaped body" is not restricted to the tablet form. Any three-dimensional form, such as tablets, beads, strands, rings, bars or flakes, for example, into which the starting materials can be brought, with or without the aid of an external container, is possible in principle.

The particle composition of the invention comprises particles of crosslinked polyvinylpyrrolidone having the specific particle size distribution. The particle composition of the invention may if desired comprise further additives. These additives may be admixed to the particles of crosslinked polyvinylpyrrolidone having the specific particle size distribution, or the particle may already comprise crosslinked polyvinylpyrrolidone and further additives, and are therefore multisubstance particles of crosslinked polyvinylpyrrolidone and additives. In this preferred embodiment of the multisubstance particles, said particles preferably have the inventive particle size distribution in accordance with features A, B, and C.

Suitable additives include in particular the excipients known from pharmaceutical tableting, such as microcrystalline celluloses, cellulose derivatives, starches, inorganic salts, and minerals, for example.

It is preferred to use particle compositions of the invention whose particles consist of crosslinked polyvinylpyrrolidone having the specific particle size distribution and thus contain no additives.

The particle compositions of the invention comprise, or preferably consist of, particles of crosslinked polyvinylpyrrolidone having a particle size distribution in which A not more than 10% by weight of the particles of the crosslinked polyvinylpyrrolidone have a size less then 63 $\mu$m, B not more than 30% by weight and at least 0.1% by weight of the particles of the crosslinked polyvinylpyrrolidone have a size greater than 1000 $\mu$m, and C at least 10% by weight of the particles of the crosslinked polyvinylpyrrolidone have a size less than 200 $\mu$m.

Advantageously, use may be made in accordance with the invention of particle compositions which comprise particles of crosslinked polyvinylpyrrolidone or preferably consist of particles of crosslinked polyvinylpyrrolidone having a particle size distribution in which A' not more than 10% by weight, preferably not more than 5% by weight, with particular preference not more than 4% by weight, in particular not more than 3% by weight of the particles of crosslinked polyvinylpyrrolidone have a particle size less than 63 $\mu$m, B' not more than 30% by weight and at least 0.1% by weight, preferably not more than 20% by weight and at least 0.5% by weight, of the particles of crosslinked polyvinylpyrrolidone have a particle size greater than 1000 $\mu$m, C' at least 10% by weight and not more than 60% by weight, preferably not more than 40% by weight of the particles of crosslinked polyvinylpyrrolidone have a particle size less than 200 $\mu$m, and D at least 5% by weight, preferably at least 10% by weight and not more than 50% by weight, preferably not more than 40% by weight, with particular preference not more than 30% by weight of the particles of crosslinked polyvinylpyrrolidone have a particle size greater than 200 $\mu$m and less than 400 $\mu$m.

Particular preference is given to particle compositions which comprise particles of crosslinked polyvinylpyrrolidone or preferably consist of particles of crosslinked polyvinylpyrrolidone having a particle size distribution in which A' not more than 10% by weight, preferably not more than 5% by weight, with particular preference not more than 4% by weight, in particular not more than 3% by weight of the particles of crosslinked polyvinylpyrrolidone have a particle size less than 63 $\mu$m, B' not more than 30% by weight and at least 0.1% by weight, preferably not more than 20% by weight and at least 0.5% by weight, of the particles of crosslinked polyvinylpyrrolidone have a particle size greater than 1000 $\mu$m, C' at least 10% by weight and not more than 60% by weight, preferably not more than 40% by weight of the particles of crosslinked polyvinylpyrrolidone have a particle size less than 200 $\mu$m, D at least 5% by weight, preferably at least 10% by weight and not more than 50% by weight, preferably not more than 40% by weight, with particular preference not more than 30% by weight of the particles of crosslinked polyvinylpyrrolidone have a particle size greater than 200 $\mu$m and less than 400 $\mu$m, E at least 10% by weight, preferably at least 15% by weight and not more than 50% by weight, preferably not more than 40% by weight of the particles of crosslinked polyvinylpyrrolidone have a particle size greater than 400 $\mu$m and less than 630 $\mu$m, and F at least 4% by weight, preferably at least 10% by weight and not more than 40% by weight, preferably not more 30% by weight of the particles of crosslinked polyvinylpyrrolidone have a particle size greater than 630 $\mu$m and less than 1000 $\mu$m.

With very particular advantage, use may be made in accordance with the invention of particle compositions comprising particles of crosslinked polyvinylpyrrolidone or preferably consisting of particles of crosslinked polyvinylpyrrolidone having a particle size distribution in which A" not more than 3% by weight of the particles of crosslinked polyvinylpyrrolidone have a particle size less than 63 $\mu$m, B" not more than 30% by weight, preferably not more than 20% by weight and at least 10% by weight of the particles of crosslinked polyvinylpyrrolidone have a particle size greater than 1000 $\mu$m, C" at least 10% by weight and not more than 30% by weight of the particles of crosslinked polyvinylpyrrolidone have a particle size less than 200 $\mu$m, D' at least 10% by weight and not more than 20% by weight of the particles of crosslinked polyvinylpyrrolidone have a particle size greater than 200 $\mu$m and less than 400 $\mu$m, E' at least 20% by weight, preferably at least 30% by weight and not more than 40% by weight of the particles of crosslinked polyvinylpyrrolidone have a particle size greater than 400 µm and less than 630 µm, and F' at least 15% by weight and not more than 30% by weight of the particles of crosslinked polyvinylpyrrolidone have a particle size greater than 630 µm and less than 1000 µm.

Particularly preferred particle compositions of the invention have a particle size distribution in accordance with features A, B, and C, preferably in accordance with features A', B', C', and D, with particular preference in accordance with features A', B', C', D, E, and F, in particular in accordance with features A", B", C", D', E', and F', and also an average particle size $X_{50}$ greater than 200 µm.

The particle compositions of the invention comprising particles of crosslinked polyvinylpyrrolidone having the specific particle size distribution may be prepared by a variety of processes.

The preparation process is not critical for the advantageous properties of the particle composition of the invention.

The particle compositions of the invention having the particle size distribution of the invention may be prepared, for example, by appropriate classification of polyvinylpyrrolidone solids prepared conventionally with a broad particle size distribution by polymerization, such as popcorn polymerization, for example, and drying.

The preparation of crosslinked polyvinylpyrrolidone by popcorn polymerization of N-vinylpyrrolidone is described, for example, in U.S. Pat. No. 3,933,766 and in documents cited therein.

The drying of the resultant crosslinked polyvinylpyrrolidone may be undertaken in conventional manner, one example being roll drying.

The subsequent classification of the polyvinylpyrrolidone solids may be undertaken, for example, by sieving or screening so as to establish the particle size distribution of the invention.

Furthermore, it is possible for example to establish the particle size distribution of the invention in the particle composition of the invention by granulating particle compositions comprising particles of crosslinked polyvinylpyrrolidone having smaller particle sizes, such as particle compositions of the brand names Kollidon CL$^{(R)}$ or Polyplasdone XL$^{(R)}$ having a particle size distribution of approximately 30 µm to 170 µm and an average particle size of 75 µm to 100 µm, for example.

In this case it is possible to set the particle size distribution of the invention directly; where appropriate, the particle size distribution of the particle composition of the invention is set by means of a subsequent classifying step.

Moreover, the particle composition of the invention comprising particles of crosslinked polyvinylpyrrolidone having the particle size distribution of the invention may also be prepared directly by the polymerization process. In this case the inventive particle size distributions of the particle compositions of the invention are set directly during the polymerization. There is no need for any constructive granulation step or classifying step.

Preferably, the particle composition of the invention is prepared by polymerization and subsequent classification to the specific particle size distribution, or by direct preparation of the particle composition of the invention in the specific particle size distribution during the polymerization, since with these processes there is not need for the relatively complex step of granulation.

With particular preference, the particle composition of the invention is prepared by direct preparation in the specific particle size distribution during the polymerization.

Accordingly, the invention additionally provides a process for preparing the particle compositions of the invention by popcorn polymerization of popcorn-polymer-forming reaction mixtures of N-vinylpyrrolidone and crosslinker in the absence of oxygen and polymerization initiators at temperatures of up to 200° C. as a precipitation polymerization in water or in bulk, with the particle size of the popcorn polymers being controlled by introduction of an inert gas stream into the reaction mixture.

For a given reaction mixture volume, which may differ depending on the dimensioning of the process and embodiment of the reactor, the particle size distribution will be set in particular through the parameter of the amount of the inert gas stream.

The particle size of the popcorn polymers is controlled by the amount of the inert gas stream which is passed through the polymerization solution. Where little inert gas is supplied to the reaction batch, the product is generally coarse popcorn polymers; where a large quantity of inert gas flows through the polymerization solution, finer popcorn polymers are formed.

Owing to different boundary conditions such as tank size, temperature and pressure, for example, it is not possible to specify any exact conditions for setting a defined particle size for the popcorn polymers. For each specific case, the correct amount of inert gas stream which must be passed through the reaction mixture may readily be determined by means of a few simple tests.

The higher the reaction mixture volume, the smaller the inert gas stream, measured in l of inert gas per hour per l of reaction mixture, what is required to achieve a particle size distribution comparable with that for a smaller reaction mixture volume.

Processes in the region of from 1 to 2000 liters of reaction mixture volume typically require from 0.01 to 100, preferably from 0.05 to 30, and in particular from 0.1 to 20 liters of inert gas per hour per liter of reaction mixture.

In the case of processes in the region of 1.5 l of reaction mixture, the inert gas stream is preferably from 2 to 20 l of inert gas/h per liter of reaction mixture, in particular from 4 to 13 l of inert gas/h per liter of reaction mixture, in order to obtain the particle compositions of the invention comprising crosslinked polyvinylpyrrolidone having the specific particle size distribution.

In the case of processes in the region of 1500 l of reaction mixture, the inert gas stream is preferably from 0.2 to 1.2 l of inert gas/h per liter of reaction mixture, in particular from 0.3 to 1.0 l of inert gas/h per liter of reaction mixture, in order to obtain the particle compositions of the invention comprising crosslinked polyvinylpyrrolidone having the specific particle size distribution Noble gases such as helium, neon or argon may be used as the inert gas. Carbon dioxide is also suitable. Nitrogen is used with preference.

In one preferred embodiment, said process for preparing the particle compositions of the invention comprising crosslinked polyvinylpyrrolidone having the specific particle size distribution comprises polymerizing N-vinylpyrrolidone in the presence of from 0.1 to 10% by weight, based on the amount of N-vinylpyrrolidone monomer used, of a crosslinker compound containing at least two ethylenically unsaturated double bonds, in the absence of polymerization initiators and oxygen, to give popcorn polymers.

The popcorn polymerization may be started, for example, by heating N-vinylpyrrolidone and small amounts, e.g., from 0.4 to 1.2% by weight, of a crosslinker such as N,N'- divinylethyleneurea in an aqueous medium in the presence of alkali. For starting the popcorn polymerization is it preferred to use freshly distilled N-vinylpyrrolidone.

The polymerization temperature may be varied within a wide range, e.g., from about 20 to 200° C., preferably from 50 to 150° C. The popcorn polymerization is accomplished particularly readily in the temperature range from about 60 to 150° C. in the absence of oxygen and polymerization initiators.

Compounds used as crosslinkers contain at least two ethylenically unsaturated double bonds in the molecule. Particularly suitable examples are alkylenebisacrylamides such as methylenebisacrylamide and N,N'-acryloylethylenediamine, N,N'-divinylethyleneurea, N,N'-divinylpropyleneurea, ethylidenebis-3-(N-vinylpyrrolidone), N,N'-divinyl-2,2'-diimidazolylbutane, and 1,1'-bis(3,3'-vinylbenzimidazolyl-2-one)-1,4-butane. Other suitable crosslinkers are, for example, alkylene glycol di(meth)acrylates such as ethylene glycol diacrylate, ethylene glycol dimethacrylate, tetraethylene glycol acrylate, tetraethylene glycol dimethacrylate, diethylene glycol acrylate, diethylene glycol methacrylate, aromatic divinyl compounds such as divinylbenzene and divinyltoluene, and also vinyl acrylate, allyl acrylate, allyl methacrylate, divinyldioxane, pentaerythritol triallyl ether, and mixtures of crosslinkers. The crosslinkers are used in amounts of from 0.1 to 10, preferably from 1 to 4, % by weight, based on the N-vinylpyrrolidone monomers used in the polymerization.

A preferred crosslinker used is N,N'-divinylethyleneurea.

The popcorn polymerization is conducted in accordance with known methods, e.g., as a precipitation polymerization or bulk polymerization. An example of a known procedure is that in which—as described in EP-B-0 177 812—the popcorn polymerization is started by heating a mixture of from 99.6 to 98.8% by weight of N-vinylpyrrolidone and 0.4 to 1.2% by weight of a crosslinker compound containing at least two ethylenically unsaturated double bonds to a temperature in the range from 100 to 150° C. in the absence of oxygen and polymerization initiators.

This polymerization is preferably initiated by the presence of small amounts of sodium hydroxide or potassium hydroxide solution. Within a short time, a polymerizable popcorn polymer is formed which, when further N-vinylpyrrolidone and further crosslinker is added, initiates and completes the popcorn polymerization of these monomers without an induction period, with an inert gas stream being passed in to regulate the particle size of the resultant popcorn polymers in accordance with the invention, the inert gas stream preferably being passed into the initial monomer charge to the polymerization vessel before popcorn polymerization is commenced. At the latest, however, the introduction of the inert gas stream is commenced during the induction period of the polymerization, and the inert gas stream is passed through the reaction mixture throughout the duration of the popcorn polymerization.

In order to conduct the popcorn polymerization without solvent, i.e., in bulk, the monomer mixture of N-vinylpyrrolidone and crosslinker is rendered inert by introduction of nitrogen and is then heated to a temperature in the range from 100 to 200° C., preferably from 150 to 180° C. It is advantageous to continue to pass a gentle stream of nitrogen through the monomers during the polymerization as well. Absence of oxygen is also achieved by polymerizing the batch at a pressure which is below atmospheric pressure and at which the monomers boil. However, it is also possible to conduct the popcorn polymerization under subatmospheric pressure with simultaneous introduction of an inert gas. Depending on the nature of the monomers used and on the chosen temperature, the mixture polymerizes within from 1 to 20 hours. For example, in the polymerization of N-vinylcarboxamidopyrrolidone with 2% by weight N,N'-divinylethyleneurea at 150° C. and a pressure of 310 mbar with introduction of nitrogen and stirring with a powerful stirrer, the first polymer particles are formed after 2.5 hours and slowly increase in quantity until after 10 hours of polymerization the reaction mixture is a powder.

For preparing the popcorn polymers, however, preference is given to precipitation polymerization in water. The monomer concentration is appropriately chosen in this case so that the reaction mixture may be stirred effectively over the entire duration of the reaction. If the concentration of the monomers in water is too high, e.g., 95% by weight, the polymer particles become tacky, and so stirring becomes more difficult than in a more dilute aqueous solution. In order to conduct the reaction in the customary stirred tanks, the chosen monomer concentrations based on the aqueous mixture are, for example, from about 5 to 30, preferably from 10 to 20% by weight. Where more powerful stirrers are available, the monomer concentration of the aqueous solution may also be increased up to 50% by weight, or possibly even higher. In certain cases it may be appropriate to commence the popcorn polymerization with a relatively concentrated solution and then to add water for dilution in the course of the reaction.

The popcorn polymerization is preferably conducted at a pH above 6 in order to prevent any possible hydrolysis of the monomers. The pH may be set by adding small amounts of bases such as sodium hydroxide or ammonia or the customary buffer salts such as sodium carbonate, sodium hydrogen carbonate or sodium phosphate. If desired, the absence of oxygen may be achieved by heating the mixture that is to be polymerized at boiling and additionally passing an inert gas stream through the reaction mixture in order to regulate the particle size of the popcorn polymers.

In certain cases it may also be advantageous to remove dissolved oxygen fully from the reaction mixture by adding small amounts—e.g., from 0.1 to 1% by weight, based on the monomers—of a reducing agent such as sodium sulfite, sodium pyrosulfite, sodium dithionite, ascorbic acid, or mixtures of the reducing agents.

The present invention accordingly further provides the process of the invention wherein the popcorn polymerization is conducted in the presence of a reducing agent.

The added reducing agent effects the particle size distribution of the resultant popcorn polymers. Where a reducing agent is added, therefore, there is a further parameter which the skilled worker must adjust by means of routine tests in order to set the desired inventive particle size distribution. In general, a larger amount of reducing agent leads to smaller polymer particles.

It is preferred to commence the introduction of inert gas into the reaction mixture before the addition of the reducing agent.

The popcorn polymers may be isolated from the aqueous solution and purified. The popcorn polymers are normally obtained with a yield of about 90 to >99% of the theoretical yield. They may be isolated from the aqueous suspension by filtering or centrifugation, with subsequent washing with water and drying in customary dryers such as circulating-air or vacuum dryers, paddle dryers, tumbler dryers, fluidized-bed dryers or pneumatic dryers. The popcorn polymers are virtually insoluble in water and all solvents, in which even their swelling is minimal.

The crosslinked polyvinylpyrrolidone particles are obtained directly in the particle composition of the invention having the specific inventive particle size distribution.

The invention further provides compact particulate laundry detergents and cleaning products which comprise the particle compositions of the invention in amounts of from 0.5 to 20% by weight, preferably from 0.5 to 10% by weight, with particular preference from 0.5 to 5% by weight.

Compact particulate laundry detergents and cleaning products have already been discussed above. Preferred compact particulate laundry detergents and cleaning products are shaped bodies suitable for washing laundry, i.e., compact particular laundry detergents and cleaning products which in addition to the particle composition of the invention as a disintegrant comprise the customary ingredients of laundry detergents.

The compact particular laundry detergents and cleaning products of the invention are produced in conventional manner by shaping, in particular by compacting, preferably by compressing of the pulverulent constituents (particle composition of the invention, as disintegrant, and customary ingredients of laundry detergents or cleaning products, bleaches, and water softeners) ("Tablettierung: Stand der Technik", SÖFW-Journal, 1996, Vol. 122, pp. 1016–1021).

Examples of customary ingredients of compact particulate laundry detergents and cleaning products are ionic, nonionic, cationic, amphoteric and zwitterionic surfactants, organic and inorganic, water-soluble or water-insoluble builder substances and cobuilders, bleaches, especially peroxy bleaches, but also active chlorine compounds, which advantageously are coated, bleach activators and bleaching catalysts, enzymes and enzyme stabilizers, foam inhibitors, antiredeposition agents, color transfer inhibitors, optical brighteners, substances which prevent the resoiling of textiles, known as soil repellents, and also customary inorganic salts such as sulfates and organic salts such as phosphonates, dyes and fragrances, and corrosion inhibitors.

Preferred laundry detergents are those known as compact detergents whose ingredients include at least one surfactant and at least one builder.

To produce the compact particulate laundry detergents and cleaning products of the invention, the particle composition of the invention is added, preferably in amounts of from 0.5 to 20% by weight, with particular preference from 0.5 to 10% by weight, with very particular preference from 0.5 to 5% by weight, based on the weight of the detersive shaped body produced, to the customary powderous ingredients of laundry detergents or cleaning products, bleaches and water softeners or their pulverulent precursors or components, prior to the final compacting or tableting step. The customary powderous ingredients of laundry detergents or cleaning products, bleaches and water softeners, their precursors and/or components are in the form, for example, of powders, granules, or strands. They have particle sizes in the range, for example, from 200 µm to 3 mm, preferably from 250 µm to 2 mm.

After the customary powderous ingredients of laundry detergents or cleaning products, bleaches and water softeners and/or their components have been mixed with the particle composition of the invention, and after further mixing steps if appropriate, the mixture is processed to aggregated compact shaped bodies in a process involving an increase in density—for example, by extrusion or compression of the mixture. In this way, tablets, beads, strands, rings or flakes, for example, are obtained. The mixture may advantageously be portioned in such a way that, for example, tablets or beads are produced in a size such that only from one to three tablets or beads are needed for one wash in a washing machine, for example. The diameter of the shaped bodies formed from the formulated mixtures is, for example, from 1 to 50 mm, preferably from 2 to 35 mm.

Even in small amounts, the particle composition of the invention leads to a considerable increase in the disintegration rate of compact particulate laundry detergents and cleaning products when they are brought together with water. Even highly compacted, fracture-resistant tablets disintegrate within a few seconds. As a result it is possible not only to put the compact particulate laundry detergents and cleaning products directly into the aqueous liquor of a machine process, using a dosing device, but also to place the compact particulate laundry detergents and cleaning products directly in the detergent compartment of the commercially customary household machines, especially the washing machines. The smaller amount of added disintegrant polymer reduces the environmental burden of the wastewater.

The examples below illustrate the invention

EXAMPLE 1

Preparation of a Particle Composition Comprising Particles of Crosslinked Polyvinylpyrrolidone having the Inventive Particle Size Distribution, on the Liter Scale A stirred apparatus was charged with 1375 g of distilled water, 115 g of N-vinylpyrrolidone, 2.6 g of N,N'-divinylethyleneurea and 0.05 g of sodium hydroxide and this initial charge was heated to 60° C. with stirring at a speed of 60 rpm. Nitrogen was passed through the solution from during the heating period right to the end of the polymerization, and was introduced into the reaction mixture with the aid of a pipe which extended down to the base of the stirred apparatus. The flow rate was 6 l/h (4.8 [l/h per liter of reaction mixture]). When the temperature of the reaction mixture reached 60° C., 130 mg of sodium dithionite were added. The mixture was held at 60° C. The popcorn polymerization began after about 20 minutes and was over after 5 hours. The viscous suspension was subsequently filtered and the solid product was washed with water (about 2000 ml) in order to remove impurities such as soluble polymer and residual monomers. The yield of popcorn polymer was 97%.

Sieve analysis:

| Example 1 | |
|---|---|
| Particle size [µm] | Fraction [%] |
| >500 | 72.0 |
| 250–500 | 13.6 |
| <250 | 14.4 |

EXAMPLE 2

Preparation of a Particle Composition Comprising Particles of Crosslinked Polyvinylpyrrolidone having the Inventive Particle Size Distribution, on the 1000-Liter Scale A stirred tank was charged with 1375 kg of distilled water, 115 kg of N-vinylpyrrolidone, 2.6 kg of N,N'-divinylethyleneurea and 1 kg of 5% strength sodium hydroxide solution and this initial charge was heated to 75° C. with stirring at a speed of 60 rpm. Nitrogen was passed through the solution from during the heating period right to the end of the polymerization, and was introduced into the reaction mixture at the bottom of the polymerization vessel. The flow rate was 1150 l/h (0.8 [l/h per liter of reaction mixture]). When the temperature of the reaction mixture had risen to 75° C., 26 g of sodium dithionite—in solution in 30 ml of water—were added. The mixture was held at 75° C. and stirring was continued. The popcorn polymerization began after about 20 minutes and was over after 6 hours. The viscous suspension was subsequently filtered and the solid product was washed with water in order to remove impurities such as soluble polymer and unpolymerized monomers. The yield of popcorn polymer was 94%.

Sieve analysis:

Example 2

| Particle size [μm] | Fraction [%] |
|---|---|
| >500 | 50 |
| 250–500 | 30 |
| <250 | 20 |

Sieve analysis in further sieving steps:

Example 2

| Particle size [μm] | Fraction [%] |
|---|---|
| >1000 | 16 |
| 630–1000 | 24 |
| 400–630 | 35 |
| 200–400 | 11 |
| 63–200 | 14 |
| <63 | 0.1 |

EXAMPLE 3

Production of Compact Particulate Laundry Detergents

In a mixer, homogeneous mixtures were prepared from a pulverulent granulated laundry detergent of composition A below (bulk density approximately 770 g/l) and different particle compositions comprising particles of crosslinked polyvinylpyrrolidone as disintegrants

EXAMPLE 3.1

Particle Composition of the Invention Prepared in Aaccordance with Example 2

EXAMPLE 3.2

Comparative Example with a Commercially Customary Popcorn Polymer Based on Polyvinylpyrrolidone and having an Average Particle Size of Less than 100 μm

EXAMPLE 3.3

Comparative Example, Taken Directly from EP 1036839, Example 1)

and each of these mixtures was compressed to tablets of about 3 g (diameter 20 mm) under the conditions indicated in the table in an eccentric press customary in the art (from Korsch, type EK 0 DMS).

The mixtures of Examples 3.1 and 3.2 each contained 2% by weight, and the mixture of Example 3.3 contained 5% by weight, of the particle composition comprising particles of crosslinked polyvinylpyrrolidone, based in each case on the total amount of the mixture.

The hardness of the tablets was determined with the aid of a tablet tester from Kraemer, Darmstadt, Germany. The instrument measures the horizontal force required to crush a tablet.

The tablets were tested for their dissolution in water (see Table 1). The dissolution in water was determined using a disintegration time tester from Erweka. For this purpose the tablets, in a disintegration test basket with a sieve base, were agitated (30 up and down movements per minute with a lift height of 20 mm) in a temperature-controlled water bath. The time after which there was no longer any residue on the sieve base was recorded. The results are reported in the table.

Laundry detergent composition A
(all figures in % by weight)

| | |
|---|---|
| Alkylbenzenesulfonate | 8 |
| Potassium coconut soap | 1.2 |
| Nonionic surfactant | 6 (1 mol of $C_{13}/C_{15}$ fatty alcohol, reacted with 7 mol of ethylene oxide) |
| Zeolite A | 35 |
| Sodium carbonate | 8 |
| Sodium metasilicate × 5.5 $H_2O$ | 6 |
| Sodium citrate | 4 |
| Sodium percarbonate | 18 |
| Tetraacetylethylenediamine (TAED) | 5 |
| Complexing agent | 0.3 (ethylenediaminetetra methylenephosphonate) |
| 70:30 acrylic acid/maleic acid copolymer, molar mass 70,000 | 4 |
| Sodium sulfate | 3 |
| Other ingredients | 2.5 (fragrances, foam suppressants, enzymes, optical brighteners) |
| Bulk density approximately 770 g/l | |
| Particle size approximately 700–1000 μm | |

TABLE 1

Properties of the laundry detergent tablets

| | Example 3.1 | Example 3.2 (comparative example) | Example 3.3 (comparative example) |
|---|---|---|---|
| Particle composition used as disintegrant | Prepared as in Example 2 | Commercial popcorn polymer | As per Ex. 1 of EP 1036839 |
| Amount of PVP used [% by weight] | 2 | 2 | 5 |
| Compression force [kN] | 9.0 | 5.98 | 6.48 |
| Compression pressure [MPa] | 14.5 | | |
| Breaking stress [N] | | | <3 |
| Dissolution in water | <30 seconds | <15 minutes | <5 seconds |

It is evident that adding the particle composition of the invention achieves much more rapid disintegration of the laundry detergent tablets. Compared with EP 1036839, much smaller amounts of crosslinked polyvinylpyrrolidone disintegrant are sufficient to achieve disintegration of comparable rapidity. This has the advantage that the environmental burden of the wastewater is greatly reduced.

What is claimed is:
1. detergent or cleanser composition comprising:
a detergent, surfactant or cleaner, and
particles of crosslinked polyvinylpyrrolidone, wherein
A not more than 10% by weight of the particles of the crosslinked polyvinylpyrrolidone have a size less than 63 μm,

B not more than 30% by weight and at least 0.1% by weight of the particles of the crosslinked polyvinylpyrrolidone have a size greater than 1000 µm, and C at least 10% by weight of the particles of the crosslinked polyvinylpyrrolidone have a size less than 200 µm.

2. A composition of claim 3 in the form of a compact particulate laundry detergent or cleaning product wherein the particles of crosslinked polyvinylpyrrolidone are present in an amount of from 0.5 to 20% by weight based on the overall mass of the detergent or cleaning product.

3. The composition of claim 1 which comprises particles of crosslinked polyvinylpyrrolidone wherein not more than 5% by weight of the particles of the crosslinked polyvinylpyrrolidone have a size less than 63 µm.

4. The composition of claim 1 which comprises particles of crosslinked polyvinylpyrrolidone wherein not more than 3% by weight of the particles of the crosslinked polyvinylpyrrolidone have a size less than 63 µm.

5. The composition of claim 1 which comprises particles of crosslinked polyvinylpyrrolidone wherein not more than 20% by weight and at least 0.5% by weight of the particles of the crosslinked polyvinylpyrrolidone have a size greater than 1000 µm.

6. The composition of claim 1 which comprises particles of crosslinked polyvinylpyrrolidone wherein at least 10% by weight and not more than 60% by weight of the particles of the crosslinked polyvinylpyrrolidone have a size less than 200 µm.

7. The composition of claim 1 which comprises particles of crosslinked polyvinylpyrrolidone wherein at least 10% by weight and not more than 40% by weight of the particles of the crosslinked polyvinylpyrrolidone have a size less than 200 µm.

8. The composition of claim 1 wherein at least 5% by weight and not more than 50% by eight of the particles of the crosslinked polyvinylpyrrolidone have a size greater than 200 µm and less than 400 µm.

9. The composition of claim 1 wherein at least 10% by weight and not more than 30% by weight of the particles of the crosslinked polyvinylpyrrolidone have a size greater than 200 µm and less than 400 µm.

10. The composition of claim 1 wherein at least 10% by weight and not more than 50% by weight of the particles of the crosslinked polyvinylpyrrolidone have a size greater than 400 µm and less than 630 µm.

11. The composition of claim 1 wherein at least 15% by weight and not more than 40% by weight of the particles of the crosslinked polyvinylpyrrolidone have a size greater than 400 µm and less than 630 µm.

12. The composition of claim 1 wherein at least 30% by weight and not more than 40% by weight of the particles of the crosslinked polyvinylpyrrolidone have a size greater than 400 µm and less than 630 µm.

13. The composition of claim 1 wherein at least 4% by weight and not more than 40% by weight of the particles of the crosslinked polyvinylpyrrolidone have a size greater than 630 µm and less than 1,000 µm.

14. The composition of claim 1 wherein at least 10% by weight and not more than 30% by weight of the particles of the crosslinked polyvinylpyrrolidone have a size greater than 630 µm and less than 1,000 µm.

15. The composition of claim 1 wherein at least 15% by weight and not more than 30% by weight of the particles of the crosslinked polyvinylpyrrolidone have a size greater than 630 µm and less than 1,000 µm.

16. The composition of claim 1 wherein the average particle size $X_{50}$ of the crosslinked polyvinylpyrrolidone particles is greater than 200 µm.

17. The composition of claim 1 which comprises a surfactant and a builder.

18. The composition of claim 1 which comprises a nomonic surfactant.

19. The composition of claim 1 which comprises an amphoteric or zwitterionic surfactant.

20. The composition of claim 1 which comprises an ionic surfactant.

21. The composition of claim 1 which comprises at least one builder and/or cobuilder.

22. The composition of claim 1 which comprises at least one bleach or active chlorine compound, bleaching catalyst or bleach activator.

23. The composition of claim 1 which comprises at least one enzyme and/or enzyme stabilizer.

24. The composition of claim 1 which comprises at least one foam inhibitor, antiredposition agent, and/or soil repellant.

25. The composition of claim 1 which comprises at least one color transfer inhibitor or optical brightener.

26. The composition of claim 1 which comprises at least one inorganic salt.

27. The composition of Claim 1 which comprises at least one dye, fragrance and/or corrosion inhibitor.

28. The composition of claim 1 which is the form of a shaped body.

29. The composition of claim 1 which is a laundry detergent.

30. The composition of claim 1 which is a dishwashing detergent.

31. A process for preparing the composition of claim 1 comprising:
   mixing the particles of crosslinked polyvinylpyrrolidone in an amount of from 0.5 to 20% by weit with one or more pulverulent ingredients of a laundry detergent and then converting the mixture into a compact form by compaction.

32. A method comprising:
   increasing the disintegration rate of a detergent, surfactant or cleanser composition by adding a particle composition comprising a plurality of particles of crosslinked polyvinylpyrrolidone, wherein
   A not more than 10% by weight of the particles of the crosslinked polyvinylpyrrolidone have a size less then 63 µm,
   B not more than 30% by weight and at least 0.1% by weight of the particles of the crosslinked polyvinylpyrrolidone have a size greater than 1000 µm, and
   C at least 10% by weight of the particles of the crosslinked polyvinylpyrrolidone have a size less than 200 µm.

33. The method as claimed in claim 32, wherein the particle composition is obtained by a polymerization process or by classifying a plurality of polyvinylpyrrolidone solids obtained by polymerization and drying.

* * * * *